Patented Aug. 26, 1952

2,608,538

UNITED STATES PATENT OFFICE 2,608,538

SURFACE COATING MATERIAL

David Aelony, Minneapolis, Minn., assignor to General Mills, Inc., a corporation of Delaware No Drawing. Application October 21, 1949, Serial No. 122,847

11 Claims. (Cl. 260—19)

The present invention relates to a surface coating material which is similar in nature to varnish.

In the ancient art of varnish making, resins were cooked for hours with drying oils at high temperatures in order to disperse the resin in the drying oil and produce a homogeneous coating composition. These operations have been tedious batch operations carried out in small kettles requiring extensive plant facilities, and occupying the equipment for long periods of time. Moreover, during the cooking there was a tendency for the composition to darken, depending upon the nature of the drying oil and the resin and the method and extent of heating. Furthermore, volatile solvents are usually added to hot varnish compositions for the purpose of reducing the viscosity to a brushable consistency, and accordingly there were fire hazards attendant this operation.

According to the present invention these difficulties encountered in the making of varnishes have been eliminated. The present invention relates to a surface coating material in the nature of a varnish, and is composed of a fatty acid ester of phenol formaldehyde resins, a rosin ester, and a solvent. The constituents are readily soluble in the solvent and no high-temperature heating is involved. The rosin ester is readily dissolved in the solvent and this solution is then added to the phenol formaldehyde resin esters to prepare the finished varnish. The resultant product dries to a highly flexible, alkali and water resistant, hard film in a very short period of time.

It is therefore an object of the present invention to provide a novel surface coating composition containing a phenol formaldehyde resin ester, a rosin ester, and a solvent.

The phenol formaldehyde resin esters employed in the present surface coating composition are those disclosed and claimed in my copending application, Serial No. 80,783, filed March 10, 1949, entitled Phenolic Resin Esters, now abandoned. As disclosed therein, these esters are derived from phenol formaldehyde resins having a molecular weight within the approximate range of 450–900, and preferably within the approximate range of 500–700. These resins are then esterified with higher unsaturated fatty acids derived from drying oils or from semi-drying oils, such as linseed oils and soybean oil. The resins may be water-white and crystal-clear, and the resultant ester may be colorless, depending upon the color of the fatty acids used for esterification. The esters themselves dry to hard, tough, resilient films, the rate of drying being dependent upon the degree of unsaturation of the fatty acid employed.

The resins used for esterification are preferably substantially free from methylol groups or contain at most only a few such groups. If there are no methylol groups present, there is no chance for further increase in the molecular weight of the resin through condensation with itself during such esterification. The resins of this type may be made by slowly adding formaldehyde to an excess of phenol containing an acid catalyst, and then carrying out the usual acid catalyzed condensation. After the condensation is completed, the resin may be cooled under nitrogen in which event it can be made water-white and crystal-clear.

Resins within the molecular weight range mentioned above may be prepared by employing from 2 to 3, preferably from 2 to 2½ moles, of formalin per four moles of phenol. Resins of this type contain an average of about 4 to 10 hydroxyl groups per molecule. The process is simple and inexpensive to conduct. Any excess phenol is readily recovered, as are the bis and tris compounds, all of which may be recovered by simply distilling them from the resinous reaction product.

The esterification may be carried out in accordance with the teachings of my copending applications, Serial Nos. 74,476, filed February 3, 1949, entitled Phenolic Esters, and 74,478, filed February 3, 1949, entitled Esterification Process. According to these applications, the resins may be esterified by heating a mixture of the resin and the fatty acids in the absence of a catalyst at temperatures in excess of 200° C., preferably from 230–250° C., or in the presence of an esterification catalyst at temperatures from 150–250° C. The water liberated during the reaction may be taken off, condensed, and the reaction carried on until the product has a desired acid number.

Considerable variation is possible both in the types of resins employed and the esters which may be prepared from these resins. Thus simple phenol formaldehyde resins as well as resins prepared from substituted phenols have been shown to produce desirable products. It is to be understood that the term "phenol formaldehyde resin" is intended to include both those prepared from unsubstituted phenols as well as those prepared from substituted phenols. It will also be apparent that the preferred range of molecular weight for the unsubstituted phenol formaldehyde resin is from 500 to 700. These resins have been found to work very saisfactorily with such semi-drying oil acids as soybean oil acids. When semi-drying oil acids are used with resins of molecular weight below 500 there is a tendency for the ester to be slow in drying. For resins within this range of molecular weight, it is therefore preferred to employ quicker drying fatty acids than soybean oil acids. Similarly, for resins having molecular weights within the range of 700–900, the fast drying oil acids and some of the semi-drying oil acids have a tendency toward the formation of gels during esterification. For use with this type of resin, therefore, it is preferred to use slower drying acids. Resins prepared from substituted phenols should have a correspondingly increased molecular weight in view of the increased combining weights of these phenols as compared with phenol itself.

It is to be understood that soybean oil acids and linseed oil acids are merely given as typical examples of oil acids in the semi-drying and drying oil classes. It will be apparent that other fatty acids in the semi-drying and drying oil groups can be used in place of those specifically mentioned.

The rosin acid ester which is employed in the composition may also be of a wide variety. In general, the rosin acid esters of any polyhydric alcohol may be employed. Typical of these rosin acid esters are ordinary ester gum prepared from glycerol, pentaerythritol rosin ester, and 2,2,6,6-tetramethylolcyclohexanol rosin acid ester. The particular rosin acid ester employed has an effect upon the properties of the ultimate product. For example, ester gum and pentaerythritol rosin esters are softer and lower melting than are the rosin esters of 2,2,6,6-tetramethylolcyclohexanol. Accordingly, varnish compositions containing these ester gums produce films which are more flexible at higher rosin ester concentration than are the films produced from the same level of 2,2,6,6-tetramethylolcyclohexanol rosin ester concentration. There is more of a tendency for the 2,2,6,6-tetramethylolcyclohexanol rosin ester varnish compositions to become brittle at high rosin ester concentrations, but at the same time the 2,2,6,6-tetramethylolcyclohexanol rosin ester varnish compositions produce harder films at lower rosin ester concentrations than do the varnishes prepared from either glycerol or pentaerythritol rosin esters. Accordingly, the type of rosin ester employed should be correlated both with the quantity thereof, as well as with the type of product desired.

It is usually found that less than 10% of the rosin ester does not appreciably change the character of the coating composition from the nature of the phenol formaldehyde resin ester. Accordingly, usually a minimum of 10% of the rosin ester is desirable. With some rosin esters, such as the rosin ester of 2,2,6,6-tetramethylolcyclohexanol, there is a tendency for extreme hardness and brittleness at concentrations substantially over 40%. Rosin ester concentrations up to 60% may be used, but the films obtained from such compositions are extremely hard and brittle and find utility chiefly on rigid articles where flexibility of the film is not a critical factor. Where flexibility is a critical factor, usually about 40% is the maximum amount of rosin ester that may be employed. The percentages of rosin ester referred to herein are percentages by weight of the rosin ester based upon the total weight of rosin ester and phenol formaldehyde resin ester.

The usual varnish solvents may be used in these compositions. Typical of these are mineral spirits and xylene. The quantity of solvent which is employed is subject to considerable variation as is well understood in the trade. The solvent is usually employed in sufficient quantity to produce the desired viscosity in the end product. Usually from 25–40% by weight of solvent based upon the total weight of the composition is found satisfactory.

In preparing the composition the rosin ester is dissolved in the solvent. This may be accomplished at room temperature, but at this temperature it requires an extended period of time. Usually it is preferred to warm the mixture of rosin ester and solvent and solution is readily effected in this manner. The solution may be effected readily at temperatures below 100° C., and does not involve any cooking. To the solution of rosin ester in the solvent, the phenol formaldehyde resin ester may be added. A short period of agitation is all that is required to produce a satisfactory finished product. Usually it is desired to add a small amount of conventional drier to the composition. This may be in the usual quantities employed. In the specific examples, 0.1% of cobalt as cobalt naphthenate was employed. It was found to give the fastest drying and the best hardness to the product. Other drier combinations which were employed include (A) 0.2% Pb, 0.02% Co; (B) 0.5% Pb, 0.05% Co; (C) 0.1% Mn; (D) 0.2% Pb, 0.02% Mn; (E) 0.7% Pb, 0.05% Co, 0.02% Mn. These percentages are all based on the weight of the non-volatile materials in the composition.

The following examples will serve to illustrate the invention:

*Example 1*

A phenol formaldehyde resin soybean oil ester was prepared as follows: 1504 g. of phenol and 4 g. of concentrated HCl were heated to 80° C. Then 810 cc. formalin was added drop by drop for 5 hours and 45 minutes. Refluxing and agitation were continued 5 hours. Heating and agitation were resumed for 3 hours; then water and phenol were distilled at 7–30 mm. absolute pressure. After the phenol was distilled off, the bis-hydroxyphenyl methane was stripped at 10–50 up to 225° C. vapor temperature, 300° C. pot temperature. The distillate weighed 181 g. The residue was cooled to 200° C. under nitrogen and poured. It weighed 1181 g. Its melting point was 107–113° C.

300 g. of the above resin, 16 g. zinc stearate, 906 g. soybean oil fatty acid, and 120 cc. xylene were refluxed and agitated under a Stark and Dean tube for 22 hours at 230–270° C. The product was evaporated, then stripped to 250° C. pot temperature at 50. The distillate weighed 121 g. The residue weighed 1047 g., $n_D^{30}$ 1.5202. The acid number of the product (residue) was 6.1, OH number 13.

Three coating compositions were prepared as listed below. These were prepared from the above phenolformaldehyde resin soybean oil ester by dissolving the rosin ester in the solvent on a steam bath and by adding and dispersing the phenol formaldehyde resin ester and the drier in the resultant solution.

(A) A solution of 20 g. ester gum and 24 g. phenol formaldehyde resin soybean oil ester and 5 cc. 1% Co drier was prepared in 27 g. mineral spirits.

(B) A solution of 20 g. pentaerythritol rosin ester, 24 g. phenol formaldehyde resin soybean oil ester and 5 cc. 1% Co drier was prepared in 27 g. mineral spirits.

(C) A mineral spirits solution containing 24% tetramethylolcyclohexanol rosin ester, 36% phenol formaldehyde resin soybean ester, 0.1% Co drier and 39.9% mineral spirits was prepared.

These coating compositions were then tested in the conventional manner and the results are shown in the following table:

|  | Composition A | Composition B | Composition C |
|---|---|---|---|
| Drying Time: |  |  |  |
| No Transfer | 55 min | 30 min | <30 min |
| Dried Through | 90 min | 60 min | 75 min |
| Lint Free | <3 hrs | <2½ hrs | 3 hrs |
| Tack Free to Foil | <6 hrs | <3½ hrs | 3¼ hrs |
| Sward Rocker Hardness | 18 (1 day) / 24 (2 days) / 40 (6 days) | 26 (1 day) / 30 (2 days) / 38 (6 days) | 42 (1 day) / 38 (3 days) |
| Film Stability: |  |  |  |
| Boiling H$_2$O | OK 2 hrs | OK 2 hrs | OK 2 hrs |
| 72 hrs. Cold H$_2$O | OK | OK | OK |
| 5 percent NaOH | OK 5 hrs | OK 5 hrs | OK 5 hrs |
| Flexibility: Mandrel Test | Passed ⅛" | Passed ⅛" | Passed ⅛" |

*Example 2*

A soybean oil ester of a phenol formaldehyde resin having a melting point of 102–107° C. and a molecular weight of 610, was prepared in the same manner as described in Example 1. Four coating compositions were prepared from this soybean oil ester containing 25%, 40%, 50% and 60% of 2,2,6,6-tetramethylolcyclohexanol rosin esters respectively, the percentages being based on the combined weight of the soybean ester and the rosin ester. Cobalt drier (0.1%) was used in all cases, and 35–50% of mineral spirits solvent was used in each instance. The characteristics of these coating compositions were determined in the usual manner and the results are listed in the following table:

| | Percentage Rosin Ester in Vehicle | | | |
|---|---|---|---|---|
| | 25% | 40% | 50% | 60% |
| Drying Time: | | | | |
| No Transfer | | <30 min | <30 min | <30 min |
| Dried Through | | 75 min | 90 min | <30 min |
| Lint Free | | 3 hrs | 2½ hrs | 1½ hrs |
| Tack Free to Foil | | 3¼ hrs | 3¾ hrs | 2½ hrs |
| Sward Rocker Hardness | 24 (1 day) / 34 (3 days) / 38 (6 days) | 42 (1 day) / 38 (3 days) | 48 (1 day) / 55 (3 days) | 48 (1 day) / 60 (3 days) |
| Film Stability: | | | | |
| Boiling H$_2$O | | OK 2 hrs | OK 2 hrs | Cloudy and brittle |
| 72 Hrs. Cold H$_2$O | | OK | OK | OK |
| 5% NaOH | | OK 24 hrs | OK 5 hrs | OK in 5 hours but brittle |
| Flexibility: Mandrel Test | | Passed ⅛" | Barely pass 1" test | Barely pass 1" test |

*Example 3*

A white enamel was made as follows: The solid was composed of 52.5 parts by weight of titanium oxide (titanox RA), 28.5 parts of phenol formaldehyde resin soybean ester similar to those described in the previous examples, and 19 parts of 2,2,6,6-tetramethylolcyclohexanol rosin ester. The solid constituents were dispersed in 31.5 parts of mineral spirits and 0.1% of cobalt drier was added. The mixture was then ground in a ball mill for 17 hours to produce a viscous, smooth white enamel of excellent drying properties and covering power. The film formed passed a ⅜" mandrel test.

While numerous modifications of the invention have been described, other modifications are also possible without departing from the spirit of the invention.

I claim as my invention:

1. A surface coating composition comprising a phenol formaldehyde resin highly esterified with an unsaturated higher fatty acid derived from an oil having at least semi-drying properties, said resin having a molecular weight within the approximate range of 450–900, and a rosin acid ester of a polyhydric alcohol, the rosin acid ester being employed in the proportion of from 10–60% of the combined weight of the rosin acid ester and the unsaturated higher fatty acid ester.

2. A surface coating composition comprising a phenol formaldehyde resin highly esterified with an unsaturated higher fatty acid derived from an oil having at least semi-drying properties, said resin having a molecular weight within the approximate range of 500–700, and a rosin acid ester of a polyhydric alcohol, the rosin acid ester being employed in the proportion of from 10–60% of the combined weight of the rosin acid ester and the unsaturated higher fatty acid ester.

3. A surface coating composition comprising a phenol formaldehyde resin highly esterified with soybean oil fatty acid, said resin having a molecular weight within the approximate range of 450–900, and a rosin acid ester of a polyhydric alcohol, the rosin acid ester being employed in the proportion of from 10–60% of the combined weight of the rosin acid ester and the soybean oil fatty acid ester.

4. A surface coating composition comprising a phenol formaldehyde resin highly esterified with linseed oil fatty acid, said resin having a molecular weight within the approximate range of 450–900, and a rosin acid ester of a polyhydric alcohol, the rosin acid ester being employed in the proportion of from 10–60% of the combined weight of the rosin acid ester and the linseed oil fatty acid ester.

5. A surface coating composition comprising a phenol formaldehyde resin, highly esterified with an unsaturated higher fatty acid derived from an oil having at least semi-drying properties, said resin having a molecular weight within the approximate range of 450–900, and a rosin acid ester of a polyhydric alcohol, the rosin acid ester being employed in the proportion of from 10–40% of the combined weight of the rosin acid ester and the unsaturated higher fatty acid ester.

6. A surface coating composition comprising a phenol formaldehyde resin highly esterified with soybean oil fatty acid, said resin having a molecular weight within the approximate range of 450–900, and a rosin acid ester of 2,2,6,6-tetramethylolcyclohexanol, the rosin acid ester being employed in the proportion of from 10–40% of the combined weight of the rosin acid ester and the soybean oil fatty acid ester.

7. A surface coating composition comprising a phenol formaldehyde resin highly esterified with soybean oil fatty acid, said resin having a molecular weight within the approximate range of 450–900, and a rosin acid ester of glycerol, the rosin acid ester being employed in the proportion of from 10–40% of the combined weight of the rosin acid ester and the soybean oil fatty acid ester.

8. A surface coating composition comprising a phenol formaldehyde resin highly esterified with soybean oil fatty acid, said resin having a molecular weight within the approximate range of 450–900, and a rosin acid ester of pentaerythritol, the rosin acid ester being employed in the proportion of from 10–40% of the combined weight of the rosin acid ester and the soybean oil fatty acid ester.

9. A surface coating composition comprising a phenol formaldehyde resin highly esterified with linseed oil fatty acid, said resin having a molecular weight within the approximate range of 450–900, and a rosin acid ester of 2,2,6,6-tetramethylolcyclohexanol, the rosin acid ester being employed in the proportion of from 10–40% of the combined weight of the rosin acid ester and the linseed oil fatty acid ester.

10. A surface coating composition comprising a phenol formaldehyde resin highly esterified with linseed oil fatty acid, said resin having a molecular weight within the approximate range of 450–900, and a rosin acid ester of glycerol, the rosin acid ester being employed in the proportion of from 10–40% of the combined weight of the rosin acid ester and the linseed oil fatty acid ester.

11. A surface coating composition comprising a phenol formaldehyde resin highly esterified with linseed oil fatty acid, said resin having a molecular weight within the approximate range of 450–900, and a rosin acid ester of pentaerythritol, the rosin acid ester being employed in the proportion of from 10–40% of the combined weight of the rosin acid ester and the linseed oil fatty acid ester.

DAVID AELONY.

REFERENCES CITED

The following references are of record in the file of this patent:

UNITED STATES PATENTS

| Number | Name | Date |
|---|---|---|
| 1,924,052 | Somerville | Aug. 22, 1933 |
| 2,091,965 | Cherry | Sept. 7, 1937 |
| 2,413,412 | Mazzucchelli | Dec. 31, 1946 |

FOREIGN PATENTS

| Number | Country | Date |
|---|---|---|
| 572,822 | Great Britain | Oct. 25, 1945 |

OTHER REFERENCES

Mattiello, Protective and Decorative Coatings, vol. I, 1941, p. 333.

Bakelite Varnish Resins Technical Data, August 1935, Bakelite Formula Suggestion XV-3433, April 16, 1935.